US009469000B2

(12) United States Patent
Schacht et al.

(10) Patent No.: US 9,469,000 B2
(45) Date of Patent: Oct. 18, 2016

(54) FIXTURE FOR VERTICAL LATHE MACHINE

(71) Applicant: Solar Turbines Inc., San Diego, CA (US)

(72) Inventors: Thomas C. Schacht, Encinitas, CA (US); Diana L. Rojo Gallegos, Tijuana (MX); David Rodriguez, Yorba Linda, CA (US)

(73) Assignee: Solar Turbines Incorporated, San Diego, CA (US)

( * ) Notice: Subject to any disclaimer, the term of this patent is extended or adjusted under 35 U.S.C. 154(b) by 154 days.

(21) Appl. No.: 14/220,558

(22) Filed: Mar. 20, 2014

(65) Prior Publication Data

US 2015/0266099 A1    Sep. 24, 2015

(51) Int. Cl.

| B23B 3/10 | (2006.01) |
|---|---|
| B23B 3/08 | (2006.01) |
| B23Q 1/00 | (2006.01) |
| B32B 25/00 | (2006.01) |

(52) U.S. Cl.
CPC .............. *B23Q 1/0072* (2013.01); *B32B 25/00* (2013.01); *B23B 3/08* (2013.01); *B23B 3/10* (2013.01); *Y10T 82/2511* (2015.01)

(58) Field of Classification Search
CPC . Y10T 82/2511; Y10T 82/2572; B23B 3/08; B23B 3/10; B23B 3/14; B23B 3/16; B23B 13/14; B23Q 3/067; B23Q 1/0072; B25B 11/005; B25B 11/02
USPC ................. 269/289 R, 309, 310, 903, 21, 60
See application file for complete search history.

(56) References Cited

U.S. PATENT DOCUMENTS

| 3,052,479 | A | 9/1962 | La Trell | |
|---|---|---|---|---|
| 3,618,961 | A | 11/1971 | Kiwalle et al. | |
| 2003/0168795 | A1 * | 9/2003 | Fries | B23Q 1/0072 269/309 |
| 2004/0207141 | A1 * | 10/2004 | Kuroda | B23Q 1/0081 269/309 |
| 2004/0244546 | A1 * | 12/2004 | Mitsuzono | B23B 1/00 82/122 |
| 2005/0029728 | A1 * | 2/2005 | Kuroda | B23Q 16/00 269/309 |
| 2015/0054211 | A1 * | 2/2015 | Hediger | B23Q 3/06 269/309 |

FOREIGN PATENT DOCUMENTS

DE           10317346 A1 * 11/2004 .......... B23Q 1/0072

* cited by examiner

*Primary Examiner* — Sunil K Singh
*Assistant Examiner* — Ryan Rufo
(74) *Attorney, Agent, or Firm* — James R. Smith (57) ABSTRACT

A vertical lathe fixture is provided. The vertical lathe fixture includes a main body and a sub-plate. The sub-plate includes a top surface and a bottom surface defining a thickness of the sub-plate therebetween. The top surface of the sub-plate is configured to be coupled to the main body and the bottom surface is configured to be coupled to a chuck of a vertical lathe machine. The sub-plate also includes a center pad provided at a center of the top surface. The center pad is configured to centrally align the sub-plate with respect to the main body. The sub-plate further includes a plurality of receiving pads provided in a radial pattern on the top surface and in relation to the center pad. The receiving pads are configured to hold the main body in a stationary position with respect to the sub-plate during rotation of the vertical lathe fixture.

19 Claims, 5 Drawing Sheets

FIXTURE FOR VERTICAL LATHE MACHINE

TECHNICAL FIELD

The present disclosure relates to a fixture for a vertical lathe machine, and more specifically to the fixture associated with a workpiece, for the vertical lathe machine.

BACKGROUND

Prior to machining a workpiece on a lathe machine, the workpiece is required to be centrally aligned with respect to a chuck and/or a turning axis of the lathe machine. This is usually done by mounting the workpiece on the chuck of the lathe machine and then centrally aligning the workpiece with respect to the chuck using suitable tools and/or centering devices.

U.S. Pat. No. 3,052,479 discloses an air pressure actuated apparatus. The air pressure actuated apparatus includes an air pump. The air pressure actuated apparatus includes an air pressure applying means for applying sub-atmospheric pressure and above atmospheric pressure to means for holding and releasing work according to the pressures. The air pressure actuated apparatus also includes a conduit means connecting the pump with the air pressure applying means. The air pressure actuated apparatus further includes a flow control means embodied in the pump manually operable for controlling the direction of flow of air passing through the pump optionally to create sub-atmospheric pressure and above atmospheric pressure in the conduit means and the air pressure applying means.

SUMMARY OF THE DISCLOSURE

In one aspect of the present disclosure, a vertical lathe fixture is provided. The vertical lathe fixture includes a main body. The vertical lathe fixture also includes a sub-plate. The sub-plate includes a top surface and a bottom surface defining a thickness of the sub-plate therebetween. The top surface of the sub-plate is configured to be coupled to the main body. The bottom surface of the sub-plate is configured to be coupled to a chuck of a vertical lathe machine. The sub-plate also includes a center pad provided at a center of the top surface. The center pad is configured to centrally align the sub-plate with respect to the main body. The sub-plate further includes a plurality of receiving pads provided in a radial pattern on the top surface and in relation to the center pad. The receiving pads are configured to hold the main body in a stationary position with respect to the sub-plate during rotation of the vertical lathe fixture.

In another aspect of the present disclosure, a vertical lathe machine is provided. The vertical lathe machine includes a power source. The vertical lathe machine also includes a chuck coupled to the power source. The vertical lathe machine further includes a fixture. The fixture includes a main body. The fixture also includes a sub-plate. The sub-plate includes a top surface and a bottom surface defining a thickness of the sub-plate therebetween. The top surface of the sub-plate is configured to be coupled to the main body. The bottom surface of the sub-plate is configured to be coupled to the chuck of the vertical lathe machine. The sub-plate also includes a center pad provided at a center of the top surface. The center pad is configured to centrally align the sub-plate with respect to the main body. The sub-plate further includes a plurality of receiving pads provided in a radial pattern on the top surface and in relation to the center pad. The receiving pads are configured to hold the main body in a stationary position with respect to the sub-plate during rotation of the fixture.

Other features and aspects of this disclosure will be apparent from the following description and the accompanying drawings.

DETAILED DESCRIPTION

Figure 1:
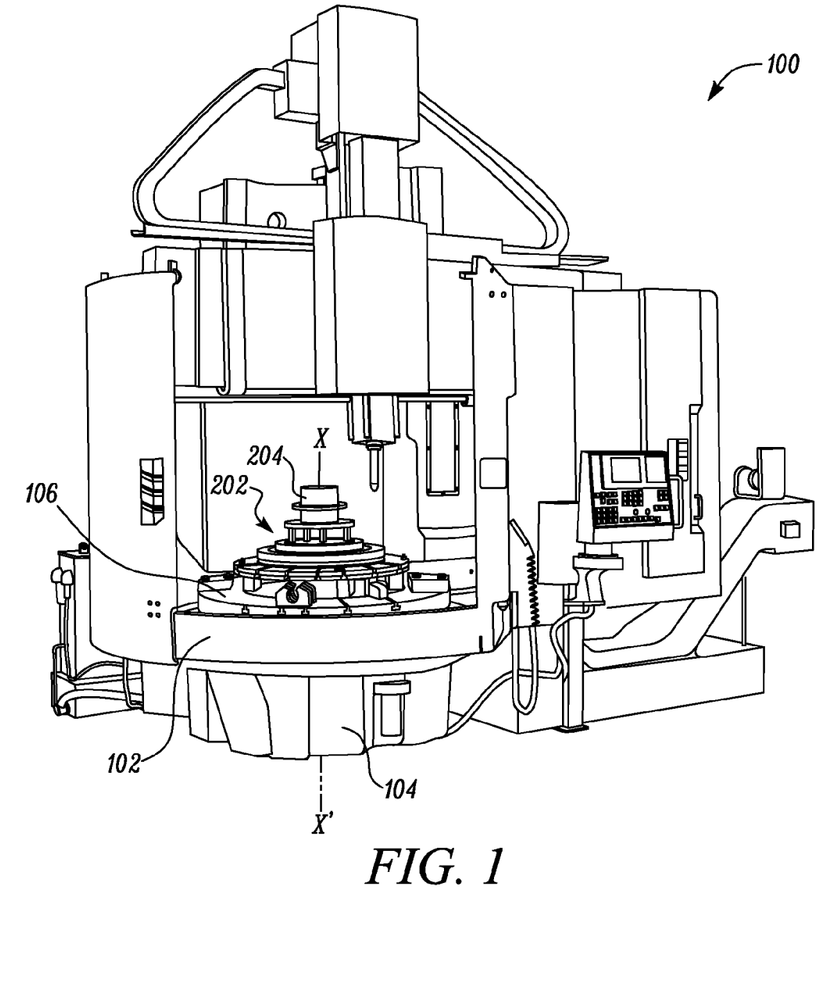
FIG. 1 is a perspective view of an exemplary vertical lathe machine, according to an embodiment of the present disclosure.

Wherever possible, the same reference numbers will be used throughout the drawings to refer to the same or the like parts. Referring to FIG. 1, a vertical lathe machine 100, hereinafter referred to as lathe 100, is illustrated. The lathe 100 is configured to perform various operations including, but not limited to, cutting, threading, drilling, facing, turning and knurling on a rotating workpiece 204. The workpiece 204 will be explained in detail with reference to FIG. 2. The workpiece 204 may experience greater stress during machining in a horizontal orientation in a horizontal lathe machine as compared to machining in a vertical orientation in the vertical lathe machine 100. Hence, while the present disclosure could be applied to the horizontal lathe machine, especially for lighter workpiece 204, the current disclosure is described in terms of the vertical lathe machine 100.

The lathe 100 includes a frame 102. The frame 102 is configured to support or mount various components of the lathe 100 thereon. The lathe 100 includes a power source 104 provided on the frame 102. In another embodiment, the power source 104 may be external to the lathe 100. The power source 104 may include any power source known in the art such as an electric motor. The power source 104 is configured to provide motive power to one or more components of the lathe 100. The lathe 100 includes a chuck 106 rotatably coupled to the frame 102. The chuck 106 is further coupled to the power source 104. The chuck 106 has a circular configuration. The chuck 106 is configured to rotate with respect to the frame 102 about a turning axis X-X'. The turning axis X-X' is vertically oriented with respect to the frame 102 making the lathe 100 the vertical lathe machine 100. The chuck 106 is also configured to receive a vertical lathe fixture 202 which will be explained in detail with reference to FIG. 2. Additionally, the lathe 100 may include one or more components (not shown) such as a tool station/post, a coolant supply system, a feed control system, an operator interface and so on.

Figure 2:
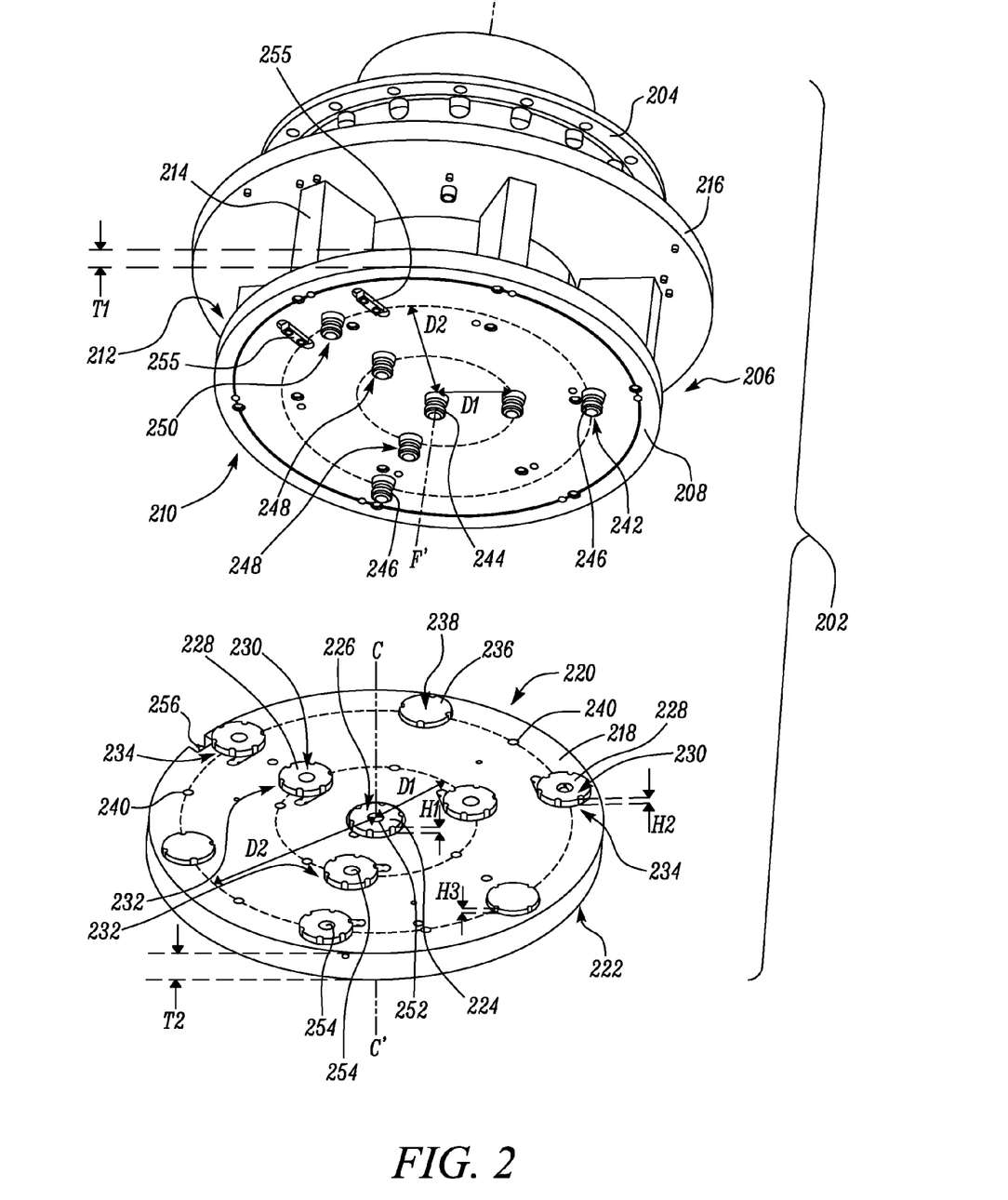
FIG. 2 is an exploded view of a vertical lathe fixture associated with the vertical lathe machine.

Referring to FIG. 2, a perspective view of the vertical lathe fixture 202, hereinafter referred to as fixture 202, for the lathe 100 is illustrated. The fixture 202 is configured to mount the workpiece 204 thereon. The workpiece 204 may be removably affixed to the fixture 202 using one or more mechanical fasteners (not shown) such as a bolt, a clamp, a pin, a weld and so on and/or a combination thereof. The fixture 202 includes a main body 206. The main body 206 includes a base plate 208 having a circular configuration and defining a central axis F-F' of the base plate 208 and/or the main body 206.

The base plate 208 includes a lower surface 210 and an upper surface 212. The upper surface 212 is parallel to the lower surface 210. The upper surface 212 and the lower surface 210 define a thickness "T1" of the base plate 208 therebetween. The upper surface 212 is configured to removably affix the workpiece 204 weighing approximately over 2500 kilograms thereon. While the fixture 202 can be used with the workpiece 204 weighing approximately under 2500 kilograms, the present disclosure is directed in part to solving problems associated with stresses that become greater the heavier the workpiece 204 is. Additionally, the upper surface 212 may include one or more ribs 214 and/or a support plate 216 coupled to the one or more ribs 214. The ribs 214 and the support plate 216 may be configured to provide additional support to the workpiece 204. The base plate 208 will be explained in more detail later.

The fixture 202 includes a sub-plate 218. The sub-plate 218 has a circular configuration defining a central axis C-C' of the sub-plate 218. The sub-plate 218 includes a top surface 220 and a bottom surface 222. The top surface 220 is parallel to the bottom surface 222. The top surface 220 and the bottom surface 222 define a thickness "T2" of the sub-plate 218 therebetween. The bottom surface 222 is configured to contact the chuck 106 of the lathe 100. The top surface 220 is configured to receive the main body 206 thereon.

The top surface 220 of the sub-plate 218 includes a center pad 224. The center pad 224 is provided at a center of the sub-plate 218 along the central axis C-C' of the sub-plate 218. The center pad 224 has a circular configuration. In another embodiment, the center pad 224 may have any other configuration including, but not limited to, rectangular, triangular, hexagonal, trapezoidal and so on. The center pad 224 is provided on the top surface 220 in a manner such that the center pad 224 extends axially away from the top surface 220. In such a situation, a top surface 226 of the center pad 224 is raised with respect to the top surface 220 of the sub-plate 218 defining a height "H1" of the center pad 224.

In another embodiment, the sub-plate 218 may include a recess (not shown) corresponding to the configuration of the center pad 224. The recess may be configured to receive the center pad 224 therein. In such a situation, the top surface 226 of the center pad 224 may be substantially coplanar with the top surface 220 of the sub-plate 218. The center pad 224 is configured to centrally align the main body 206 with respect to the sub-plate 218.

The top surface 220 of the sub-plate 218 includes a plurality of receiving pads 228. The plurality of receiving pads 228 is provided in a radial arrangement with respect to the center pad 224. More specifically, the receiving pads 228 are provided in a Y-shaped pattern in relation to the center pad 224. The radial pattern and/or the Y-pattern is configured to provide a large holding force to the main body 206 against the high levels of stress produced during machining of the workpiece 204. Each of the receiving pads 228 has a circular configuration. In another embodiment, each of the receiving pads 228 may have any other configuration including, but not limited to, rectangular, triangular, hexagonal, trapezoidal and so on.

The receiving pad 228 is provided on the top surface 220 in a manner such that the receiving pad 228 extends axially away from the top surface 220. In such a situation, a top surface 230 of the receiving pad 228 is raised with respect to the top surface 220 of the sub-plate 218 defining a height "H2" of the receiving pad 228. In another embodiment, the sub-plate 218 may include a recess (not shown) corresponding to the configuration of the receiving pad 228. The recess may be configured to receive the receiving pad 228 therein. Here, the top surface 230 of the receiving pad 228 may be substantially coplanar with the top surface 220 of the sub-plate 218. The receiving pad 228 is configured to receive and hold the main body 206 and the workpiece 204 in a stationary position with respect to the sub-plate 218 during rotation of the main body 206 and the workpiece 204.

A first set 232 of the receiving pads 228 is provided at a first distance "D1" from the center pad 224. Further, each of the first set 232 of the receiving pads 228 is equidistant from one another. Additionally, a second set 234 of the receiving pads 228 is provided at a second distance "D2" from the center pad 224, such that the second distance "D2" is different from the first distance "D1". Each of the second set 234 of the receiving pads 228 is equidistant from one another. The arrangement of the receiving pads 228 described herein is exemplary and does not limit the scope of the present disclosure. The number of sets of the receiving pads 228 may vary based on a diameter of the sub-plate 218 and as per system design and requirements. For example, for the sub-plate 218 having a relatively small diameter, the sub-plate 218 may include only the first set 232 of the receiving pads 228. For the sub-plate 218 having a relatively larger diameter, the sub-plate 218 may include the first and second sets 232, 234 of the receiving pads 228. Based on an increase in the diameter of the sub-plate 218, the sub-plate 218 may additionally include more receiving pads 228.

In some embodiments, the number of sets of the receiving pads 228 may vary based on an overall weight of the main body 206 and/or the workpiece 204. For example, for the main body 206 and/or the workpiece 204 having a relatively lower overall weight, the sub-plate 218 may include only the first set 232 of the receiving pads 228. For the main body 206 and/or the workpiece 204 having a relatively higher overall weight, the sub-plate 218 may include the first and second sets 232, 234 of the receiving pads 228 and so on.

The top surface 220 of the sub-plate 218 may also include one or more support pads 236. The support pad 236 is configured to support at least a portion of the main body 206 when the main body 206 is mounted on the sub-plate 218. More specifically, the support pad 236 is configured to rest at least a portion of the lower surface 210 of the base plate 208 of the main body 206 thereupon. The support pad 236 may be provided at any location on the top surface 220. For example, in one embodiment, the support pads 236 may be provided at the first distance "D1" from the center pad 224. In such a situation, each of the support pads 236 may be equidistant from one another and/or the receiving pads 228. In another embodiment, the support pads 236 may be provided at the second distance "D2" from the center pad 224. In such a situation, each of the support pads 236 may be equidistant from one another and/or the receiving pads 228. The location of the support pad 236 disclosed herein is merely exemplary and may vary based on system design and requirements and may not limit the scope of the disclosure.

The support pad 236 is provided on the top surface 220 in a manner such that the support pad 236 extends axially away from the top surface 220. In such a situation, a top surface 238 of the support pad 236 is raised with respect to the top surface 220 of the sub-plate 218 defining a height "H3" of the support pad 236. A structure of the support pad 236 is substantially different from that of the center and receiving pads 224, 228. The structure of the center and receiving pads 224, 228 is configured to centrally align the main body 206 on the sub-plate 218 and hold the main body 206 on the sub-plate 218 respectively, whereas the structure of the support pad 236 is configured to rest at least the portion of the main body 206 thereupon.

The center pad 224, the receiving pad 228 and/or the support pad 236 is affixed to the sub-plate 218 by any fastening method known in the art including, but not limited to, bolting, riveting, welding, brazing, soldering and adhesion. In other embodiments, the center pad 224, the receiving pad 228 and/or the support pad 236 may be integrally formed with the sub-plate 218 during manufacturing of the sub-plate 218. The center pad 224, the receiving pad 228 and/or the support pad 236 may be formed of any metal or alloy known in the art such as, brass, steel and so on. The center pad 224, the receiving pad 228 and/or the support pad 236 may be formed by any known manufacturing process such as forging, casting and so on.

The sub-plate 218 is configured to be coupled to the chuck 106 of the lathe 100. More specifically, the sub-plate 218 is provided centrally aligned with respect to the chuck 106 such that the turning axis X-X' coincides with the central axis C-C' of the sub-plate 218. The diameter of the sub-plate 218 is smaller than a diameter of the chuck 106. In other embodiments, the diameter of the sub-plate 218 may be equal to or greater than the diameter of the chuck 106. The diameter of the sub-plate 218 may be based on a diameter and/or the weight of the main body 206 and/or the workpiece 204.

The sub-plate 218 is affixed to the chuck 106 by bolting. Accordingly, the sub-plate 218 is provided with one or more bores 240 to receive one or more bolts (not shown) respectively. In other embodiments, the sub-plate 218 may be affixed to the chuck 106 by any fastening method known in the art such as riveting, welding, brazing, soldering, clamping and so on.

Referring now to the main body 206, the base plate 208 includes one or more mechanical fasteners 242 provided on the lower surface 210. The mechanical fastener 242 is configured to removably affix the main body 206 to the sub-plate 218. More specifically, the lower surface 210 includes a center pin 244 extending axially away from the lower surface 210. The center pin 244 is provided at a center of the base plate 208 along the central axis F-F' of the base plate 208 and in cooperation with the center pad 224 of the sub-plate 218. The center pin 244 has a cylindrical configuration. In other embodiments, the center pin 244 may have a polygonal configuration. The center pin 244 is configured to provide centering of the main body 206 with respect to the center pad 224 and/or the central axis C-C' of the sub-plate 218 when the main body 206 is mounted on the sub-plate 218.

Further, the base plate 208 includes a plurality of support pins 246 extending axially away from the lower surface 210. The plurality of support pins 246 is provided in a Y-shaped pattern on the lower surface 210 in relation to the center pin 244. The Y-shaped pattern of the plurality of support pins 246 corresponds to the Y-shaped pattern of the plurality of receiving pads 228. Each of the plurality of support pins 246 has a cylindrical configuration. In other embodiments, each of the plurality of support pins 246 may have any other configuration for example, polygonal.

A first set 248 of the support pins 246 is provided at the first distance "D1" from the center pin 244. The first distance "D1" is equal to the first distance "D1" between the center pad 224 and the first set 232 of the receiving pads 228. Further, each of the first set 248 of the support pins 246 is equidistant from one another. A second set 250 of the support pins 246 may additionally be provided at the second distance "D2" from the center pin 244. It should be noted that the second distance "D2" is equal to the second distance "D2" between the center pad 224 and the second set 234 of the receiving pads 228. Further, each of the second set 250 of the support pins 246 is equidistant from one another. The number of sets of the support pins 246 may vary based on the diameter of the base plate 208 and/or the overall weight of the main body 206 and/or the workpiece 204.

Referring now to the sub-plate 218, the center pad 224 includes a center bore 252. The center bore 252 is configured to receive the center pin 244. Additionally, each of the plurality of receiving pads 228 includes a receiving bore 254. The receiving bore 254 is configured to receive the respective support pin 246 provided on the base plate 208 of the main body 206. Additionally, the base plate 208 of the main body 206 includes at least a pair of support blocks 255 provided on the lower surface 210 of the base plate 208. More specifically, the pair of support blocks 255 is provided on either side of one support pin 246 of the second set 250. In other embodiments, the pair of support blocks 255 may be provided on either side of more than one support pins 246 of the second set 250. In yet other embodiments, the pair of support blocks 255 may be provided on either side of the one or more support pins 246 of the first set 248.

Figure 4:
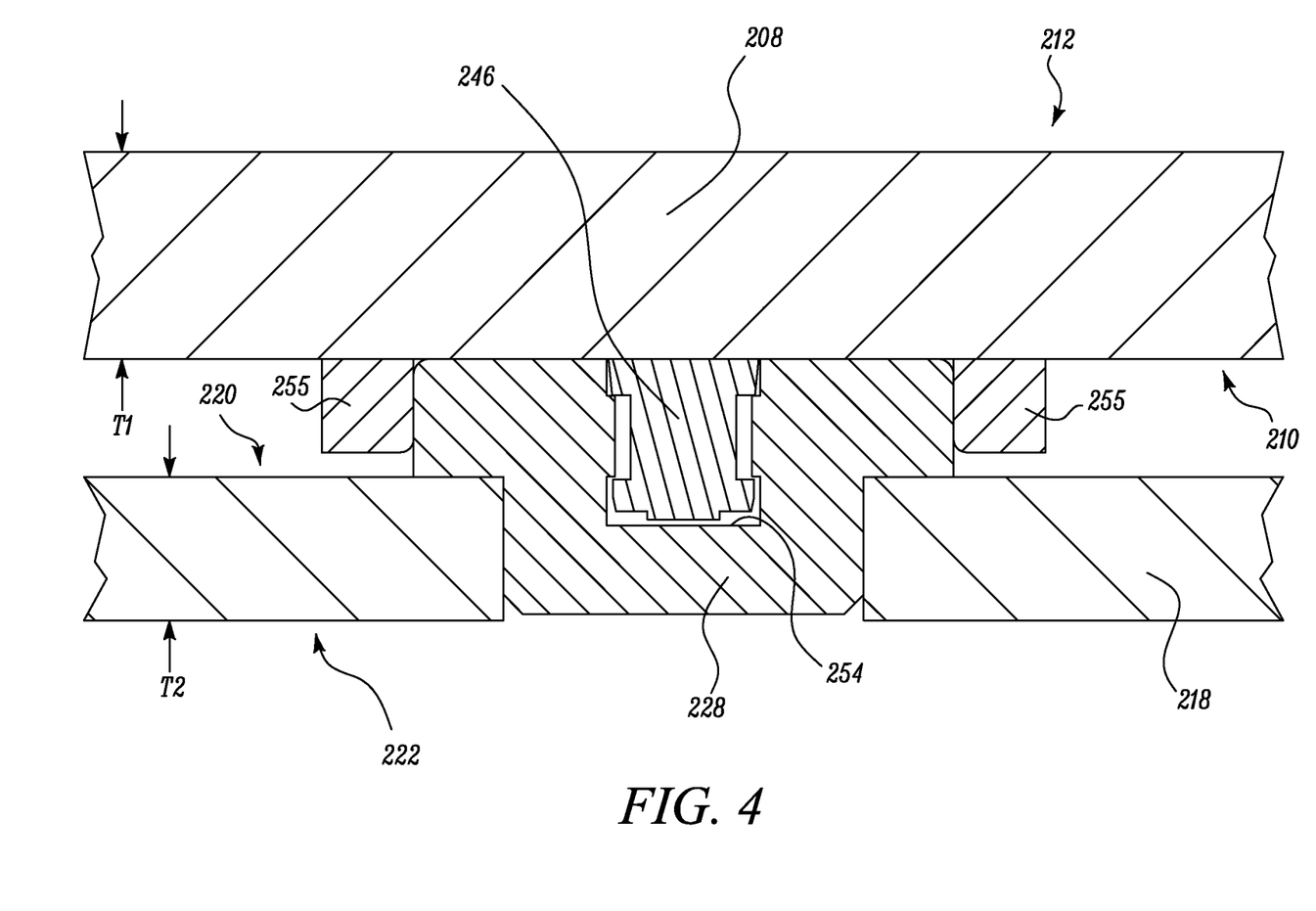
FIG. 4 is a partial cross sectional view of the vertical lathe fixture assembled on the vertical lathe machine.

Referring to FIG. 4, a partial cross sectional view of the vertical lathe fixture assembled on the vertical lathe machine is shown. When the main body 206 is provided on the sub-plate 218 such that the center and support pins 244, 246 are provided in the center and receiving bores 252, 254 respectively, the pair of support blocks 255 is configured to circumferentially contact with the respective receiving pad 228 of the sub-plate 218. The pair of support blocks 255 is configured to provide additional torque resistance to the support pin 244 and the receiving pad 228 during rotation of the fixture 202.

At least one of the center pad 224 and the receiving pad 228 includes a locking mechanism (not shown). For example, the locking mechanism includes a locking element that is pneumatically operated. In another embodiment, the locking element may be hydraulically operated. Accordingly, as shown in FIG. 2, the sub-plate 218 may be provided with an inlet port 256. The inlet port 256 is configured to receive pressurized air. Further, the sub-plate 218 may include one or more internal channels (not shown). The internal channel may be provided between the inlet port 256 and the center and receiving pads 224, 228. The internal channel may be configured to provide fluid communication between the inlet port 256 and the center and/or receiving pads 224, 228. More specifically, the internal channel may be configured to provide a passage for the pressurized air from the inlet port 256 towards the locking elements of the center and receiving pads 224, 228 respectively.

When the main body 206 is provided on the sub-plate 218 such that the center and support pins 244, 246 are provided in the center and receiving bores 252, 254 respectively, the locking element contracts and locks around the center and support pins 244, 246, thus, firmly holding the center and support pins 244, 246 within the center and receiving bores 252, 254 respectively. During releasing of the main body 206 from the sub-plate 218, the pressurized air is provided to the center and receiving bores 252, 254 through the inlet port 256.

The locking mechanism is configured in such a manner that when the pressurized air contacts the locking element, the locking element expands within the center and receiving bores 252, 254. The expansion of the locking element provides a clearance between the locking element and the center and support pins 244, 246 respectively. As a result, the center and support pins 244, 246 get unlocked from the center and receiving bores 252, 254 respectively. When a supply of the pressurized air is terminated, the locking elements return to their original compressed position within the center and receiving bores 252, 254 to lock the center and support pins 244, 246 respectively.

In other embodiments, the locking mechanism may be mechanically operated using one or more components including locking elements, levers, gears, coupling arrangements and so on. Alternatively, the locking mechanism may be electromechanically operated using one or more components including locking elements, levers, gears, coupling arrangements, electrical/electronic switches, electrical/electronic circuits and so on. The locking mechanism is configured to securely hold the center pin 244 and the support pins 246 within the center pad 224 and/or the receiving pads 228 respectively. Further, the locking mechanism is configured to couple the base plate 208 and/or the main body 206 to the sub-plate 218. It should be noted that the locking mechanism disclosed herein is merely exemplary and may vary as per system design and requirements without limiting the scope of the disclosure.

Figure 3:
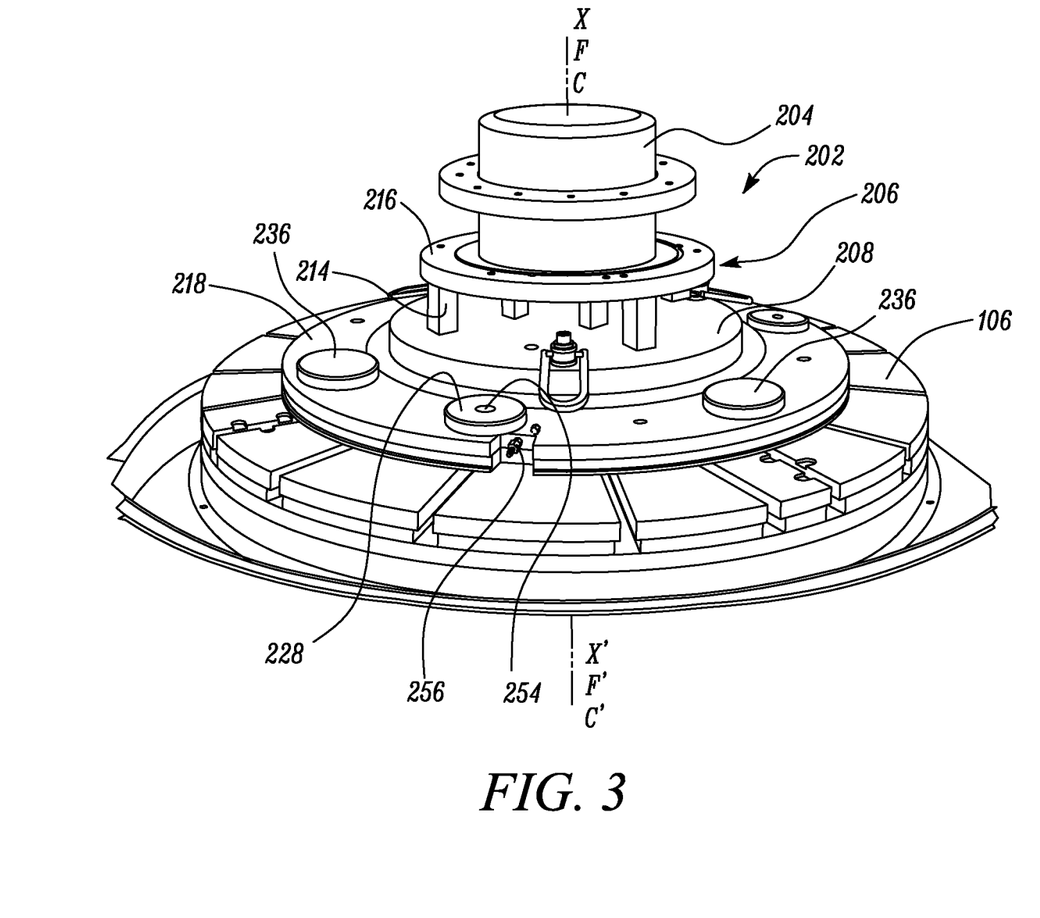
FIG. 3 is a perspective view of the vertical lathe fixture assembled on the vertical lathe machine.

Referring to FIG. 3, a perspective view of the chuck 106, the sub-plate 218, the main body 206 and the workpiece 204 in an assembled position is illustrated. More specifically, in the assembled position, the central axis C-C' of the sub-plate 218 and the central axis F-F' of the main body 206 is aligned with the turning axis X-X' about which the chuck 106 rotates.

In another embodiment, the sub-plate 218 is configured to be rotatably coupled to an independent setup table associated with the lathe 100. Referring to FIG. 4, a perspective view of a setup table 500 is illustrated. In such a situation, the bottom surface 222 of the sub-plate 218 is configured to rotatably contact with a base 502 of the setup table 500. Accordingly, the bottom surface 222 of the sub-plate 218 plate may be provided with a bearing arrangement (not shown) including bearing elements, grooves and so on.

Figure 5:
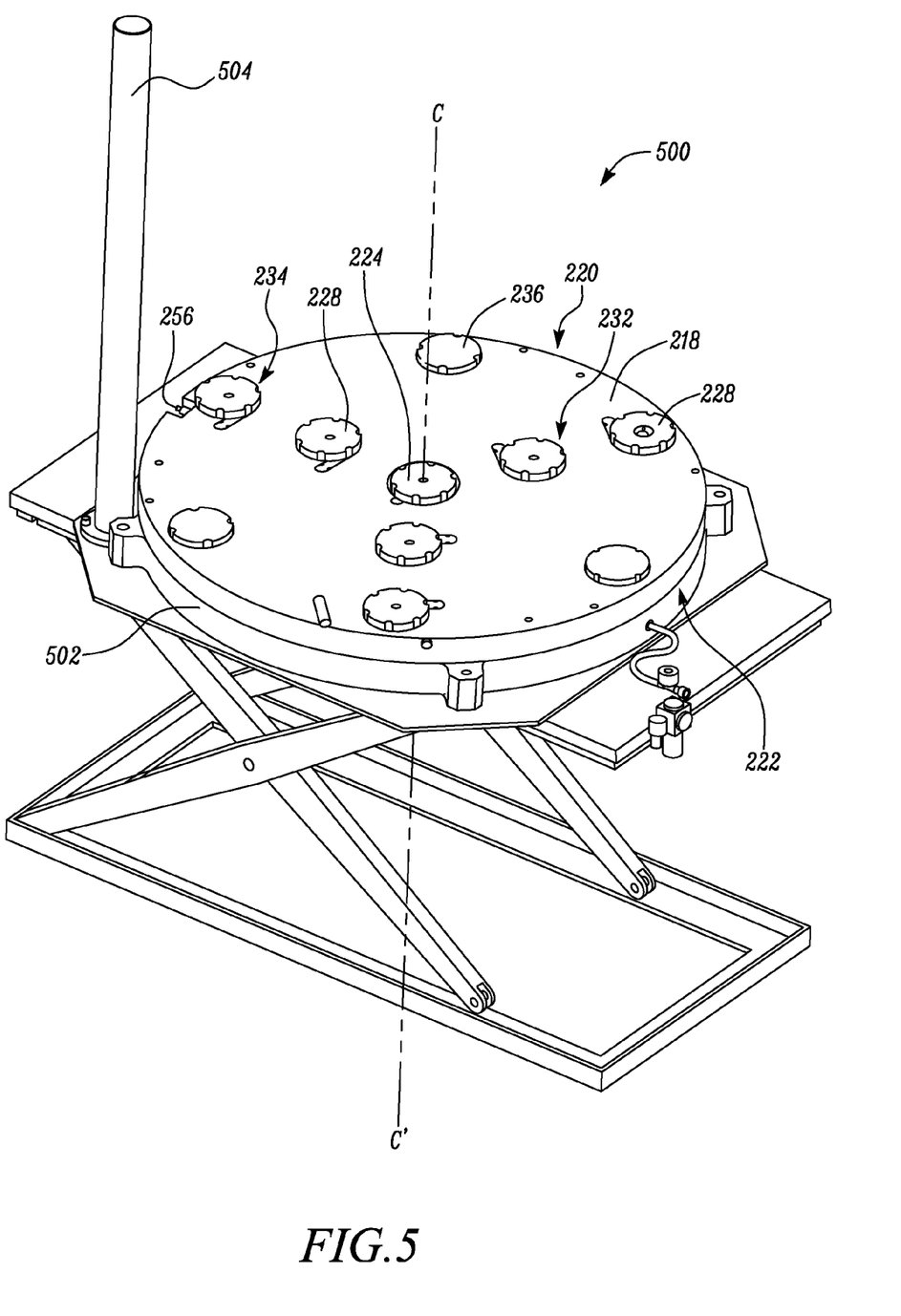
FIG. 5 is a perspective view of an exemplary setup table associated with the vertical lathe machine.

The top surface 220 of the sub-plate 218 may be identical and correspond to the configuration of the sub-plate 218 provided on the chuck 106 of the lathe 100. More specifically, the center pad 224, the receiving pads 228 and/or the support pads 236 of the sub-plate 218 provided on the setup table 500 correspond to the center pad 224, the receiving pads 228 and/or the support pads 236 of the sub-plate 218 coupled to the chuck 106 in location and structure. The setup table 500 is configured to align the central axis F-F' of the main body 206 and/or a center of the workpiece 204 with respect to the central axis C-C' of the sub-plate 218. Further, the setup table 500 includes a support rod 504. The support rod 504 is configured to mount and/or support a centering device (not shown) such as dial indicator, a probe indicator, a digital indicator and so on. The centering device may be configured to align the central axis F-F' of the main body 206 and/or a center of the workpiece 204 with respect to the central axis C-C' of the sub-plate 218, using suitable tools.

INDUSTRIAL APPLICABILITY

Prior to machining the workpiece on the lathe, the workpiece is required to be centrally aligned with respect to the chuck and/or the turning axis of the lathe. This is usually done by mounting the workpiece on the chuck of the lathe and then centrally aligning the workpiece with respect to the chuck, the turning axis using suitable tools and/or centering devices. During this process, the lathe may remain idle without performing any machining process until the centering process is completed. The idle time of the lathe may lead to reduction in efficiency and production output.

The present disclosure relates to a method of centering the workpiece 204 with respect to the center of the fixture 202 and/or the chuck 106 of the lathe 100. Before machining of the workpiece 204 on the lathe 100, the workpiece 204 may be mounted on the main body 206 of the fixture 202. The workpiece 204 may be removably affixed to the base plate 208 and/or the support plate 216 using the mechanical fastener. The main body 206 along with the workpiece 204 mounted thereon may then be mounted on the sub-plate 218 that is rotatably provided on the base 502 of the setup table 500. During mounting of the main body 206 on the sub-plate 218, the center pin 244 and the plurality of support pins 246 may be aligned and received within the center pad 224 and the plurality of receiving pads 228 respectively. Further, the sub-plate 218 along with the main body 206 and the workpiece 204 may be rotated with respect to the base 502 of the setup table 500. The center of the workpiece 204 may be then aligned with the central axis C-C' of the sub-plate 218 and/or the central axis F-F' of the main body 206 using suitable tools and the centering device.

After the workpiece 204 may be centered with respect to the central axis C-C' of the sub-plate 218 and/or the central axis F-F' of the main body 206, the main body 206 along with the workpiece 204 may be released from the sub-plate 218 of the setup table 500. Further, the main body 206 along with the workpiece 204 may be mounted on the sub-plate 218 coupled to the chuck 106 of the lathe 100. During mounting of the main body 206 on the sub-plate 218, the center pin 244 and the plurality of support pins 246 may be aligned and received within the center pad 224 and the receiving pads 228 respectively.

The configuration of the sub-plate 218 provided on the setup table 500 corresponds to the configuration of the sub-plate 218 provided on the chuck 106. Further, the sub-plate 218 may be centrally aligned with respect to the chuck 106. As a result, when the main body 206 and the workpiece 204 may be mounted on the chuck 106, the main body 206 and the workpiece 204 may correspondingly align with respect to the chuck 106. Additionally, the pair of support blocks 255 may provide additional torque resistance to the support pin 246 and the receiving pad 228 during rotation of the fixture 202.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A vertical lathe fixture comprising:
 a main body having a center pin, the center pin extending axially away from the main body; and
 a sub-plate comprising:
 a top surface and a bottom surface defining a thickness of the sub-plate therebetween, wherein the top surface of the sub-plate is configured to be coupled to the main body, wherein the bottom surface of the sub-plate is configured to be coupled to a chuck of a vertical lathe machine;

a center pad provided at a center of the top surface, the center pad configured to receive the center pin to centrally align the sub-plate with respect to the main body;

a plurality of receiving pads provided in a radial pattern on the top surface and in relation to the center pad, the receiving pads configured to hold the main body in a stationary position with respect to the sub-plate during rotation of the vertical lathe fixture and at least a pair of support blocks provided on a lower surface of the main body, the pair of support blocks configured to circumferentially contact with the receiving pad of the sub-plate.

2. The vertical lathe fixture of claim 1, wherein the receiving pads are provided in a Y-shaped pattern in relation to the center pad.

3. The vertical lathe fixture of claim 1, wherein:
a first set of the receiving pads is provided at a first distance from the center pad; and
a second set of the receiving pads is provided at a second distance from the center pad, the first and second distances being different from one another.

4. The vertical lathe fixture of claim 1, wherein each of the receiving pads are equidistant from one another.

5. The vertical lathe fixture of claim 1 further comprising:
a support pad provided on the sub-plate spaced apart from the receiving pads, the support pad configured to support at least a portion of the main body thereon.

6. The vertical lathe fixture of claim 1, wherein the bottom surface of the sub-plate is configured to contact with an independent setup table associated with the vertical lathe machine.

7. The vertical lathe fixture of claim 1, wherein at least one of the center pad and the receiving pad extend axially away from the top surface of the sub-plate.

8. The vertical lathe fixture of claim 1, wherein the sub-plate is coupled to the main body using a mechanical fastening means.

9. The vertical lathe fixture of claim 8, wherein the pair of support blocks is provided on either side of the mechanical fastening means on the lower surface of the main body.

10. The vertical lathe fixture of claim 1, wherein at least one of the center pad and the receiving pad include a locking mechanism configured to couple the main body to the sub-plate.

11. The vertical lathe fixture of claim 10, wherein the locking mechanism is operated by at least one of a fluid, a mechanical and an electromechanical means.

12. The vertical lathe fixture of claim 1, wherein at least one of the center pad and the receiving pad is affixed to the sub-plate using at least one of welding, bolting and riveting.

13. A workpiece machined using the vertical lathe fixture of claim 1.

14. The vertical lathe fixture of claim 13, wherein the workpiece is over 2500 kilograms.

15. A vertical lathe machine comprising:
a power source;
a chuck coupled to the power source; and
a fixture comprising:
a main body; and
a sub-plate comprising:
a top surface and a bottom surface defining a thickness of the sub-plate therebetween, wherein the top surface of the sub-plate is configured to be coupled to the main body, wherein the bottom surface of the sub-plate is configured to be coupled to the chuck of the vertical lathe machine;
a center pad provided at a center of the top surface, the center pad configured to centrally align the sub-plate with respect to the main body; and
a plurality of receiving pads provided in a radial pattern on the top surface and in relation to the center pad, the receiving pads configured to hold the main body in a stationary position with respect to the sub-plate during rotation of the fixture wherein a first set of the receiving pads is provided at a first distance from the center pad; and a second set of the receiving pads is provided at a second distance from the center pad, the first and second distances being different from one another.

16. The vertical lathe machine of claim 15, wherein the receiving pads are provided in a Y-shaped pattern in relation to the center pad.

17. The vertical lathe machine of claim 15 further comprising:
a support pad provided on the sub-plate spaced apart from the receiving pads, the support pad configured to support at least a portion of the main body thereon.

18. The vertical lathe machine of claim 15 further comprising:
at least a pair of support blocks provided on a lower surface of the main body, the pair of support blocks configured to circumferentially contact with the receiving pad of the sub-plate.

19. A vertical lathe fixture comprising:
a main body having a center pin, the center pin extending axially away from the main body; and
a sub-plate comprising:
a top surface and a bottom surface defining a thickness of the sub-plate therebetween, wherein the top surface of the sub-plate is configured to be coupled to the main body, wherein the bottom surface of the sub-plate is configured to be coupled to a chuck of a vertical lathe machine;
a center pad provided at a center of the top surface, the center pad configured to receive the center pin to centrally align the sub-plate with respect to the main body; and
a plurality of receiving pads provided in a radial pattern on the top surface and in relation to the center pad, the receiving pads configured to hold the main body in a stationary position with respect to the sub-plate during rotation of the vertical lathe fixture;
wherein the receiving pads are provided in a Y-shaped pattern in relation to the center pad.

* * * * *